US011930310B2

(12) United States Patent
Choi

(10) Patent No.: US 11,930,310 B2
(45) Date of Patent: Mar. 12, 2024

(54) SPEAKER GRILLE FOR VEHICLE AND MANUFACTURING METHOD THEREOF

(71) Applicants: Hyundai Motor Company, Seoul (KR); Kia Corporation, Seoul (KR)

(72) Inventor: Dong Jae Choi, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 220 days.

(21) Appl. No.: 17/227,816

(22) Filed: Apr. 12, 2021

(65) Prior Publication Data

US 2022/0248113 A1 Aug. 4, 2022

(30) Foreign Application Priority Data

Feb. 4, 2021 (KR) ........................ 10-2021-0016340

(51) Int. Cl.
*H04R 1/02* (2006.01)
*B21D 28/26* (2006.01)
*B21D 53/88* (2006.01)

(52) U.S. Cl.
CPC ............. *H04R 1/023* (2013.01); *B21D 28/26* (2013.01); *B21D 53/88* (2013.01); *H04R 2201/029* (2013.01); *H04R 2400/11* (2013.01)

(58) Field of Classification Search
CPC ...... B21D 28/26; B21D 35/007; B21D 53/88; H04R 1/023; H04R 2201/029
See application file for complete search history.

(56) References Cited

U.S. PATENT DOCUMENTS

| | | | | |
|---|---|---|---|---|
| 6,533,980 | B1 | 3/2003 | van Manen | |
| 2021/0051383 | A1* | 2/2021 | Choi | H04R 1/023 |
| 2022/0248113 | A1* | 8/2022 | Choi | H04R 1/023 |

FOREIGN PATENT DOCUMENTS

| | | | |
|---|---|---|---|
| JP | 2006211732 | A * | 8/2006 |
| JP | 2010114806 | A | 5/2010 |
| KR | 101200450 | B1 | 11/2012 |
| KR | 101440466 | B1 | 9/2014 |
| KR | 101739420 | B1 | 5/2017 |
| WO | 2019-087323 | A1 | 5/2019 |

* cited by examiner

*Primary Examiner* — Minh N Trinh
(74) *Attorney, Agent, or Firm* — Fox Rothschild LLP

(57) ABSTRACT

A speaker grille for a vehicle includes a steel plate, an adhesive layer formed on the steel plate, and a metal sheet layer formed on the adhesive layer. The speaker grille is configured such that the steel plate, the adhesive layer, and the metal sheet layer are stacked in sequence. The speaker grille has a plurality of holes formed through the speaker grille, and the holes may be formed by punching. A method of method for manufacturing the speaker grille can include a step of manufacturing a stack by forming the adhesive layer on the steel plate and forming the metal sheet layer on the adhesive layer; and a step of forming the plurality of holes through the stack by perforating the stack.

10 Claims, 11 Drawing Sheets

SPEAKER GRILLE FOR VEHICLE AND MANUFACTURING METHOD THEREOF

CROSS-REFERENCE TO RELATED APPLICATION

This application claims under 35 U.S.C. § 119(a) the benefit of Korean Patent Application No. 10-2021-0016340, filed in the Korean Intellectual Property Office on Feb. 4, 2021, the entire contents of which are incorporated herein by reference.

BACKGROUND

(a) Technical Field

The present disclosure relates to a vehicle speaker grille having satisfactory surface decoration, corrosion resistance, mass production, and hole exterior characteristics, and a manufacturing method thereof.

(b) Description of the Related Art

A metal speaker grille for a vehicle is formed of stainless steel or aluminum. In the case of stainless steel, a chemical etching method using a masking film is used to ensure decoration, precision, and a suitable opening ratio of speaker holes. In contrast, in the case of aluminum, a precision machining (NC) method rather than chemical etching is applied to fabricate holes because a thick material must be applied due to lower stiffness of aluminum than stainless steel. In machining a speaker grille, chemical etching is more advantageous than precision machining in terms of costs. However, due to a limitation depending on equipment scale, chemical etching has a problem in which costs exponentially rise with an increase in area of the speaker grille.

A method for fabricating holes of a speaker grille using mechanical punching is proposed as an alternative. The punching method is more advantageous than chemical etching or precision machining in terms of costs. However, due to the nature of the punching method and the speaker grille, it is difficult to apply an existing material to a vehicle part as it is. Specifically, when stainless steel is perforated, a phenomenon is observed in which an edge around a hole is rounded. Therefore, the exterior quality is degraded, and thus it is difficult to apply the perforated stainless steel to a vehicle part. Furthermore, when the punching method is applied to a stainless steel material, due to the nature of the mechanical property of the material and the method, a limitation in the dimension of a hole (size and interval) and a decrease in mass production are accompanied, and therefore it is difficult to apply the stainless steel material to a vehicle part.

In particular, a vehicle having a metal speaker grille applied thereto is typically a luxury vehicle requiring decorativeness of unique texture of metal in addition to sound performance (small thickness and high opening ratio), and a speaker grille to which a punching method is applied is difficult to apply to a vehicle due to deficiencies in exterior characteristics. Specifically, in terms of the exterior quality of a perforation, metal may have higher precision (smaller clearance and smaller plastic deformation) than stainless steel, which is an alloy, due to low yield strength and strain, but it is difficult to apply metal as a material of a speaker grille for a vehicle due to deficiencies in surface decoration and corrosion resistance.

Furthermore, because a metal material capable of being used for a speaker grille must ensure corrosion resistance, stainless steel or anodized aluminum may be applied. However, stainless steel has higher stiffness than general steel, and aluminum has a limitation in the size or interval of holes for ensuring an opening ratio due to large thickness. Therefore, it is difficult to apply a punching method in manufacturing a metal speaker grille.

Meanwhile, a speaker grille must have a small thickness and a high opening ratio (a hole area per unit area) for sound performance. However, when the material of an existing metal speaker grille is perforated, sound performance for a vehicle is not satisfactory, and due to a reduction in durability life of a punching mold, uniform mass production cannot be ensured. Furthermore, steel, which is a material more suitable for punching, is easily corroded when exposed to the atmosphere containing moisture, and red rust occurs on a scratch portion even though a thin clear coating for maintaining metallic feel is applied. Moreover, in the case of a galvanized steel plate, corrosion may be slightly improved, but the galvanized steel plate is not suitable for decoration due to difficulty in surface processing representing metal texture.

Accordingly, in manufacturing a speaker grille by applying a punching method, further research on a vehicle speaker grille having excellent decoration, corrosion resistance, mass production, and hole exterior characteristics and a manufacturing method thereof are required to overcome the aforementioned shortcomings of conventional materials and processes.

SUMMARY

An aspect of the present disclosure provides a speaker grille that has satisfactory mass production and economical efficiency by applying a punching method and is suitable for a vehicle due to excellent decoration, corrosion resistance, and hole exterior characteristics, and a manufacturing method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a speaker grille for a vehicle includes a steel plate, an adhesive layer formed on the steel plate, and a metal sheet layer formed on the adhesive layer and is configured such that the steel plate, the adhesive layer, and the metal sheet layer are stacked in sequence. The speaker grille has a plurality of holes formed through the speaker grille, and the holes are formed by punching.

According to another aspect of the present disclosure, a method for manufacturing a speaker grille for a vehicle includes a step of manufacturing a stack by forming an adhesive layer on a steel plate and forming a metal sheet layer on the adhesive layer and a step of forming a plurality of holes through the stack by perforating the stack.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this specification, when a member is referred to as being "on" another member, it may mean that the member is directly on the other member or another member is present therebetween.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Speaker Grille for Vehicle

Figure 1:
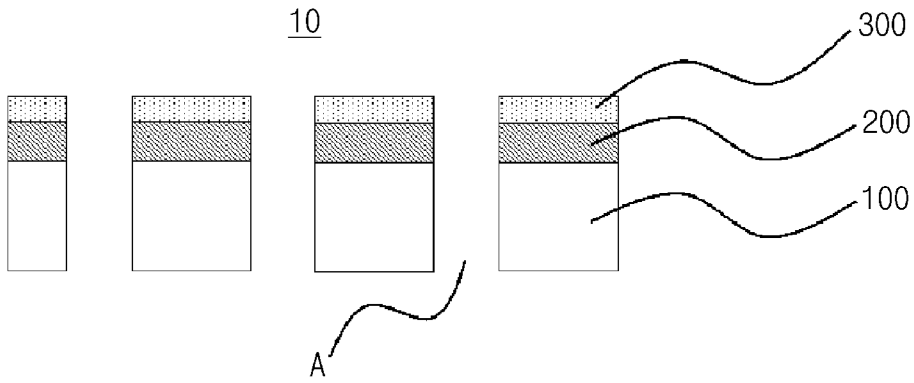
FIGS. 1, 3, and 4 are sectional views of a speaker grille for a vehicle according to an embodiment of the present disclosure.

Referring to FIG. 1, a speaker grille 10 for a vehicle according to the present disclosure is configured such that a steel plate 100, an adhesive layer 200 formed on the steel plate 100, and a metal sheet layer 300 formed on the adhesive layer 200 are stacked in sequence. The speaker grille 10 includes a plurality of holes A formed through the speaker grille.

The metal sheet layer 300 preferably is provided at the top of the speaker grille 10 for the vehicle to ensure surface decoration and corrosion resistance required for the speaker grille 10, and the steel plate 100 preferably is provided at the bottom of the speaker grille 10 to maintain a physical property suitable for a punching method. That is, the speaker grille 10, which includes the metal sheet layer 300 and the steel plate 100, has excellent surface decoration and corrosion resistances and has excellent mass production and economical efficiency due to suitability of the punching method. Furthermore, the speaker grille 10 including, at the bottom thereof, the steel plate 100 having low elongation may minimize burrs generated during punching. In addition, even though punching is applied, the speaker grille 10 including the metal sheet layer 300 at the top thereof and the steel plate 100 at the bottom thereof may minimize sagging of a surface, compared to stainless steel in the related art.

Steel Plate

The steel plate 100 is a main constituent of the speaker grille for the vehicle. No special limitation applies to the steel plate 100 as long as it can be used to manufacture the speaker grille 10 for the vehicle. For example, the steel plate 100 may be a stainless steel plate, an aluminum steel plate, or the like.

The steel plate 100 may be a galvanized steel plate. When a galvanized steel plate is used as the steel plate 100, corrosion resistance of a perforated hole cross-section and a rear surface is complemented, as compared with when a non-plated steel plate is used.

The steel plate 100 may include a bumpy structure on a surface thereof. That is, depressions having a predetermined depth and width may be formed on the surface of the steel plate 100 by surface machining. For example, the machining may be performed through various methods, such as forming depressions by rubbing abrasive paper against the surface of the steel plate 100, forming embossed parts on the surface of the steel plate 100 by passing the steel plate between two emboss rolls on which embossings having a predetermined shape are formed, performing hairline machining allowing an abrasive to collide with the surface of the steel plate 100, and the like. However, the present disclosure is not limited thereto.

The steel plate 100 may have an average thickness of 0.3 mm to 0.7 mm, or may have an average thickness of 0.4 mm to 0.6 mm. When the average thickness of the steel plate 100 is within the range, the opening ratio of a hole satisfying sound performance and the minimum dent resistance may be ensured in the perforated speaker grille. Furthermore, when the average thickness of the steel plate 100 is below the range, the dent resistance of a speaker itself may be insufficient, and when the average thickness of the steel plate 100 is above the range, the sound performance of a manufactured speaker may be deteriorated, the durability life of a pin during punching may be reduced, or exterior characteristics may be deteriorated due to an increase in shear plane of a perforation Adhesive Layer The adhesive layer 200 serves to bond the steel plate 100 and the metal sheet layer 300.

The adhesive layer 200 may contain one or more adhesives selected from the group consisting of a polyurethane-based adhesive, a polyester-based adhesive, and a polyolefin-based adhesive.

For example, the adhesive layer 200 may be of a film type or a sheet type.

The adhesive layer 200 may have an adhesive force of 100 N/25 mm or more, or may have an adhesive force of 100 N/25 mm to 250 N/25 mm.

The adhesive layer 200 may have an average thickness of 5 μm to 40 μm, or 5 μm to 30 μm. When the average thickness of the adhesive layer 200 is within the range, a phenomenon in which the adhesive layer 200 is exposed or pressed may be minimized. Furthermore, when the average thickness of the adhesive layer 200 is below the range, an inter-layer adhesive force may be insufficient, and when the average thickness of the adhesive layer 200 is above the range, the adhesive layer 200 may be pressed together with an upper stainless sheet during punching, and the exterior of a hole may be insufficient.

Metal Sheet Layer

The metal sheet layer 300 serves to improve exterior characteristics, corrosion resistance, and surface decoration of the speaker grille.

The metal sheet layer 300 may be a stainless steel. Specifically, the metal sheet layer 300 may include one or more stainless steels selected from the group consisting of a stainless steel, a ferritic stainless steel, an austenitic stainless steel, and a martensitic stainless steel.

The metal sheet layer 300 may have a tensile strength of 400 MPa to 800 MPa, or 500 MPa to 700 MPa, and may have an elongation of 25% to 60%.

The metal sheet layer 300 may have an average thickness of 0.05 mm to 0.5 mm, or 0.1 mm to 0.3 mm. When the average thickness of the metal sheet layer 300 is within the range, the thickness of the metal sheet layer 300 may be appropriate, and thus performance such as surface decoration and corrosion resistance can be ensured at the same time that the speaker grille can be manufactured by punching. Furthermore, when the average thickness of the metal sheet layer 300 is below the range, a thickness required for machining may not be ensured, or usability may be deteriorated due to a small thickness, and when the average thickness of the metal sheet layer 300 is above the range, it may be difficult to form a hole having a size suitable for the speaker grille.

Holes

The holes A are formed through the speaker grille 10 and serve as passages through which sound waves pass in the speaker grille 10. The holes are formed by punching. Due to this, the speaker grille 10 has excellent mass production and economical efficiency.

Because hundreds of holes are densely formed in the surface of the speaker grille 10, the quality of the hole shape plays a decisive role in the exterior quality of the speaker grille. As the peripheries of the holes become clear, the overall exterior decoration quality is improved. In contrast, as pressing (sagging) of edges of the holes becomes larger, the exterior quality is deteriorated. The pressing (sagging) of the edges of the holes depend on a material thickness, a physical property, and a clearance of a mold. The pressing phenomenon is decreased with a decrease in the material thickness, the ductility, or the clearance of the mold or with an increase in compressive stress on a surface. However, when a high-strength material is used for the hole exterior quality or the mold clearance is reduced, a force required for punching is increased, which leads to an increase in damage or wear of the mold and a reduction in lifetime. Accordingly, the present disclosure improves the hole exterior quality by adjusting the thicknesses of the steel plate 100 and the metal sheet layer 300 and the clearance of the mold.

The holes may have various shapes such as a circular shape, an oval shape, a polygonal shape, and the like. Specifically, the holes may have a circular shape.

The diameter of the holes and the minimum distance between the holes may be adjusted by the diameter of punching pins of a punching machine, the interval between the punching pins, the diameter of a die, and the like. When the holes have an oval shape, the average diameter of the holes may be the average of the long diameter and the short diameter of the holes, and when the holes have a polygonal shape, the average diameter of the holes may be the diameter of circles in which the polygonal holes are inscribed.

Figure 2:
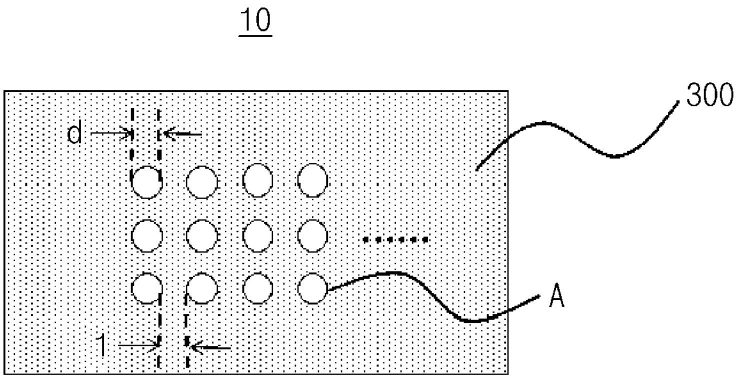
FIG. 2 is a front view of the speaker grille for the vehicle according to an embodiment of the present disclosure.

Specifically, the holes A may have an average diameter d of 0.5 mm to 3.0 mm, or 0.5 mm to 2.5 mm, and the minimum distance 1 between the holes may be 0.5 mm or more, or may range from 0.5 mm to 5.0 mm (see FIG. 2). When the minimum distance between the holes is below the range, the opening ratio may be raised, and thus sound performance may be improved. However, the stiffness, that is, the dent resistance of the speaker grille, which must protect a speaker, may be deteriorated. When the minimum distance between the holes is above the range, the dent resistance may be improved, but the sound performance may be deteriorated.

Figure 3:
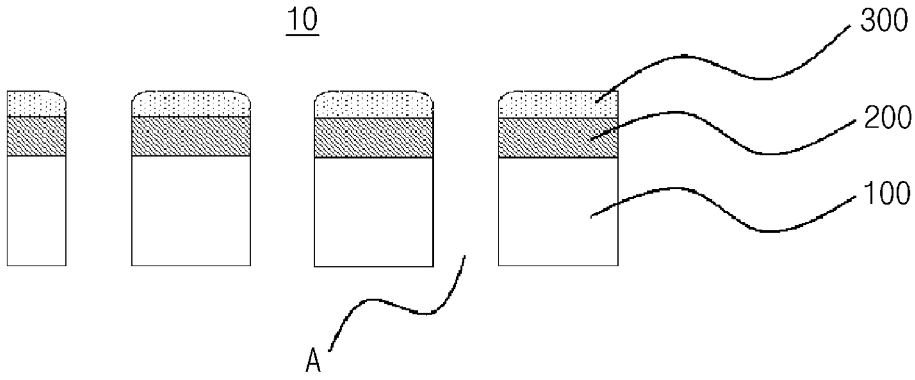

Referring to FIG. 3, the holes A may have an undercut shape in which the edge toward the metal sheet layer 300 has a curved line. The holes of the present disclosure are formed by punching. The holes may have an undercut shape in which the edge toward the metal sheet layer 300 has a curved line by punching. When the edges of the holes toward the metal sheet layer 300 have a curved line as described above, a problem of a feeling of roughness on the surface of the speaker grille due to an increase in surface roughness caused by a sharp hole edge and a problem of bodily damage to a person due to the sharp edge may be prevented.

The speaker grille 10 for the vehicle may have an opening ratio of 35 area % to 50 area % or 40 area % to 45 area %, and the total thickness of the speaker grille may range from 0.4 mm to 0.8 mm, or from 0.6 mm to 0.7 mm. When the opening ratio of the speaker grille 10 is within the range, sound performance required for a vehicle speaker may be satisfied. Furthermore, when the total thickness of the speaker grille 10 is within the range, stiffness (dent resistance) required for a vehicle part may be satisfied.

Figure 4:
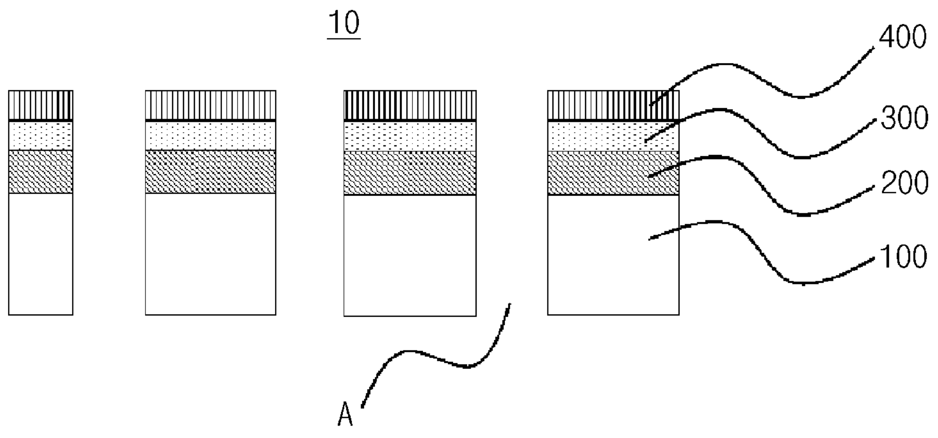

The speaker grille 10 for the vehicle may additionally include a top coating layer on the metal sheet layer (see FIG. 4).

Top Coating Layer

Referring to FIG. 4, the top coating layer 400 is formed on the metal sheet layer 300 and serves to protect the metal sheet layer from contamination, scratches, corrosion, or the like while maintaining the unique luster of the metal sheet layer.

The top coating layer 400 may be a coating layer containing an inorganic material, and the inorganic material may include one or more materials selected from the group consisting of silicon (Si), aluminum (Al), titanium (Ti), and zirconium (Zr).

The top coating layer 400 may have an average thickness of 1 μm to 10 μm, or 2 μm to 5 μm. When the average thickness of the top coating layer 400 is within the range, excellent proj ectivity and processability may be ensured.

Furthermore, the speaker grille 10 for the vehicle may additionally include a painting layer on the metal sheet layer.

Painting Layer

The painting layer is formed on the metal sheet layer and serves to implement a color. For example, when the speaker grille for the vehicle includes both the top coating layer and the painting layer, the painting layer may be formed between the metal sheet layer and the top coating layer.

The painting layer may have an average thickness of 50 nm to 200 nm, or 50 nm to 150 nm. When the average thickness of the painting layer is within the range, the painting layer may maintain a color for decoration, compared to a painting layer having a greater thickness than the painting layer and may be easy to perforate and/or etch to fabricate a speaker hole, a logo, or the like. That is, when the average thickness of the painting layer is below the range, effects (e.g., color implementation and decoration) due to the painting layer may be insufficient, and when the average thickness of the painting layer is above the range, due to the thickness of the painting layer, the painting layer may not be easy to perforate and/or etch to fabricate a speaker hole, a logo, or the like.

The painting layer may contain one or more compounds selected from the group consisting of a titanium compound, a chromium compound, and a zirconium compound.

Specifically, the titanium compound may contain one or more materials selected from the group consisting of TiC, TiCrN, TiN, and TiAN. The chromium compound may contain one or more materials selected from the group consisting of CrN and TiCrN. The zirconium compound may contain one or more materials selected from the group consisting of ZrN, TiZrN, and ZrCN.

As described above, the speaker grille for the vehicle according to the present disclosure exhibits excellent exterior characteristics, particularly, excellent hole exterior characteristics. Accordingly, the speaker grille has excellent decoration and corrosion resistance and is suitable for a vehicle.

Method for Manufacturing Speaker Grille for Vehicle

A method for manufacturing a speaker grille 10 for a vehicle according to the present disclosure includes a step of manufacturing a stack 20 and a step of forming a plurality of holes by punching.

Step of Manufacturing Stack

In this step, the stack 20 is manufactured by forming an adhesive layer 200 on a steel plate and forming a metal sheet layer 300 on the adhesive layer 200.

The steel plate 100, the adhesive layer 200, and the metal sheet layer 300 are as described with regard to the speaker grille 10 for the vehicle. Furthermore, the steel plate 100, the adhesive layer 200, and the metal sheet layer 300 may have a roll form, but are not limited thereto.

Figure 5:
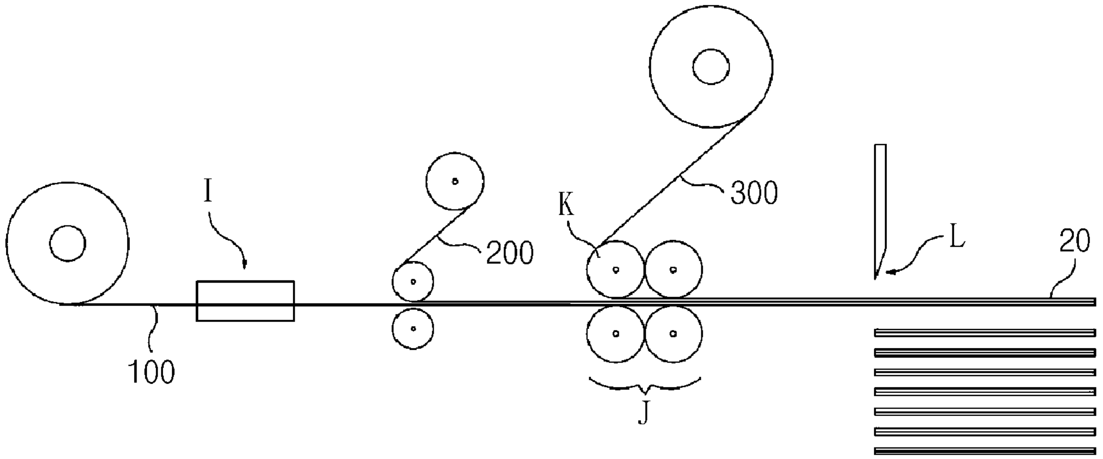
FIG. 5 is a schematic view illustrating a method for manufacturing a stack according to an embodiment of the present disclosure.

For example, the layers of the stack 20 may be formed on the steel plate 100 by a roll-to-roll method. Referring to FIG. 5, the stack 20 may be manufactured by forming the adhesive layer 200 on the steel plate 100 and forming the metal sheet layer 300 on the adhesive layer 200. A step of preheating the steel plate 100 with a pre-heater I before forming the adhesive layer 200 may be additionally included. The formation of the metal sheet layer 300 may be performed by using a heating roller K and a heater J. The stack 20 may be cut by a cutting member L. No special limitation applies to the pre-heater I, the heater J, the heating roller K, and the cutting member L as long as they can be used in a roll-to-roll method.

A painting layer may be additionally formed on a surface of the metal sheet layer 300 by surface-treating the metal sheet layer 300 prior to this step.

The surface-treatment may be performed by using a deposition method. For example, the deposition may be performed at a temperature of 60° C. to 120° C. and at a vacuum level of $1\times10^{-7}$ torr to $1\times10^{-5}$ torr. Specifically, the deposition may be performed at a temperature of 65° C. to 115° C., or 70° C. to 110° C., and ata vacuum level of $5\times10^{-7}$ torr to $5\times10^{-6}$ torr, or $8\times10^{-7}$ torr to $3\times10^{-6}$ torr. When deposition temperature is within the range, the density and adhesion of the deposited painting layer may be increased, and when the vacuum level is within the range, the painting layer having a uniform deposition thickness may be obtained.

Furthermore, the surface-treatment may use physical vapor deposition (PVD). Specifically, the surface-treatment may form the painting layer by depositing metal on one surface of the metal sheet layer 300 having a roll form by using PVD. More specifically, the surface-treatment may form the painting layer by depositing metal on one surface of the metal sheet layer having a roll form by a roll-to-roll process using PVD.

The physical vapor deposition (PVD) may include sputtering, E-beam evaporation, thermal evaporation, laser molecular beam epitaxy (L-MBE), or pulsed laser deposition (PLD).

Figure 6:
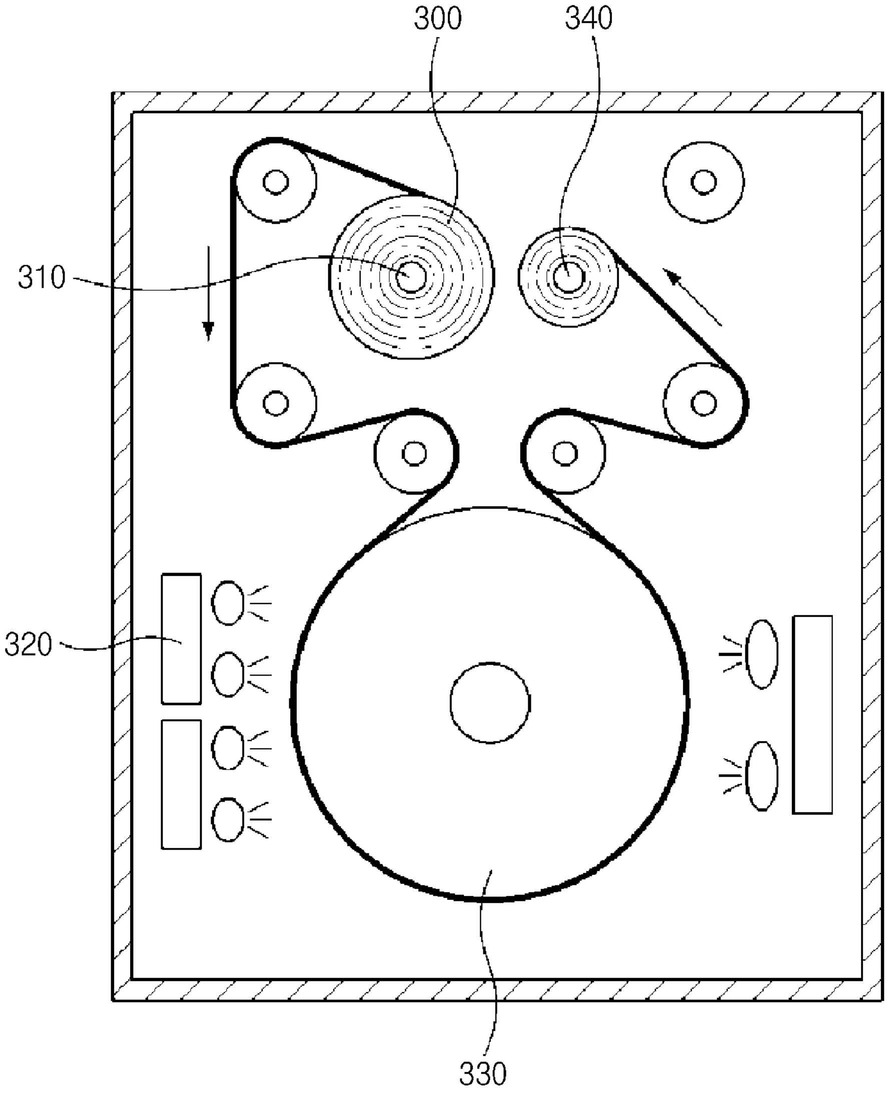
FIG. 6 is a schematic view illustrating formation of a painting layer according to an embodiment of the present disclosure.

Referring to FIG. 6, the surface-treatment may form the continuous painting layer having a uniform thickness by using a sputter 320 when the metal sheet layer 300 having a roll form moves from an un-winding coil 310 to a winding coil 340 while rotating along a deposition roll 330. Due to this, the surface-treatment method illustrated in FIG. 6 may be advantageous for mass production and may be easily applied to various fields because various forms of parts are able to be made by cutting the roll-shaped metal sheet layer 300, which has the painting layer formed on one surface thereof, to a desired size and additionally processing the cut metal sheet layer 300.

The material and thickness of the painting layer are as described with regard to the speaker grille for the vehicle.

Step of Forming Holes by Punching

In this step, a plurality of holes are formed through the stack 20 by perforating the stack 20.

Figure 7:
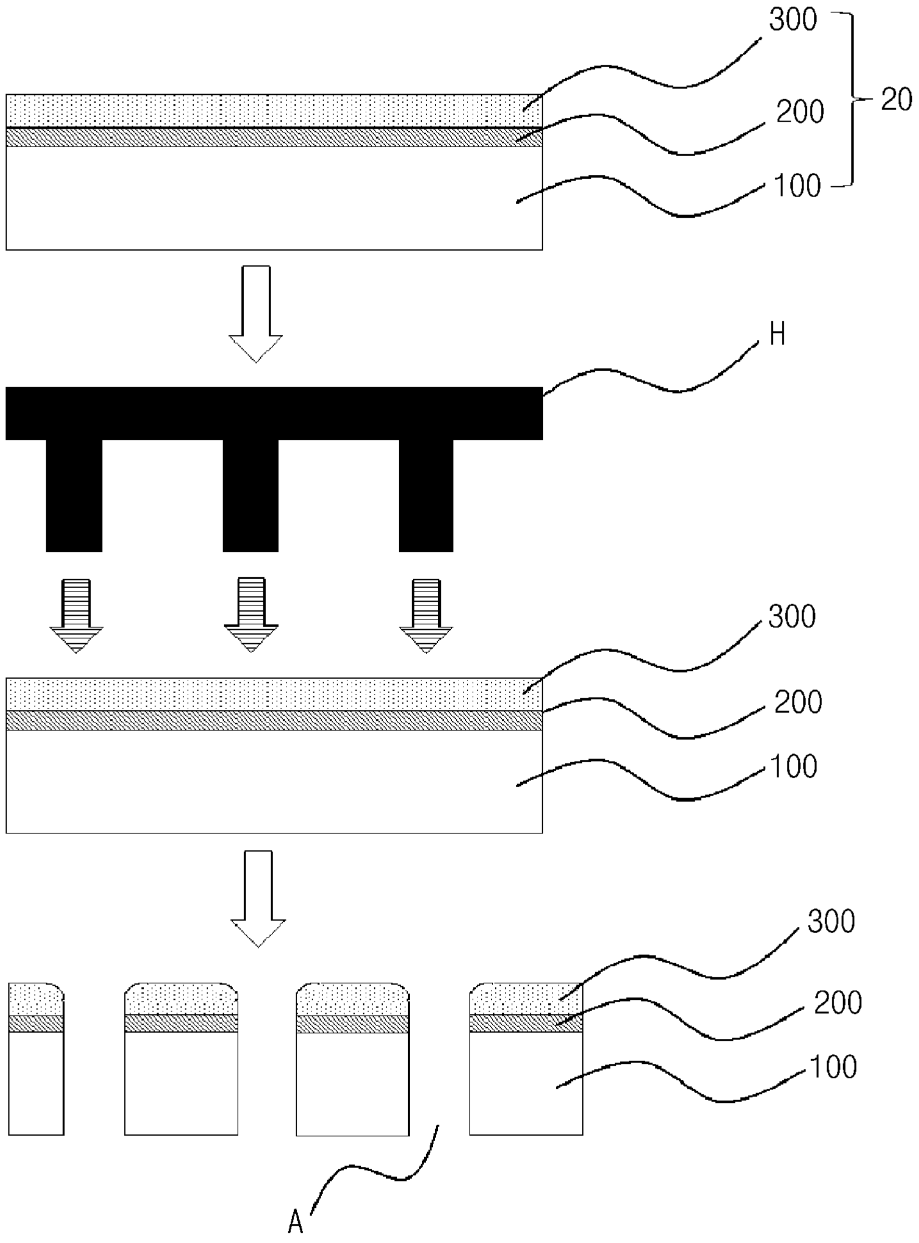
FIGS. 7 and 8 are sectional views illustrating a step of forming holes by punching according to an embodiment of the present disclosure.

Referring to FIG. 7, in this step, the plurality of holes A may be formed through the stack 20 by perforating the stack 20 using a punching machine H. The punching machine H may be of a press-type using a punching mold, and a pin of the punching mold may be of a blade tip R-processing type (PRC), a blade tip C-chamfering type (PCC), a conical blade tip type (GC), or the like. Punching speed is not specially limited and, for example, may range from 40 spm to 50 spm. No special limitation applies to a punching load as long as it is applicable to a general punching process using the punching mold. For example, the punching load may range from 3.0 ton to 4.5 ton or from 3.5 ton to 4.3 ton.

In this step, the stack may be perforated such that the holes have an average diameter of 0.5 mm to 3.0 mm and the minimum distance between the holes is 0.5 mm or more.

As illustrated in FIG. 7, the holes A of the perforated stack may have an undercut shape in which the edge toward the metal sheet layer 300 has a curved line. The undercut shape is a shape generated by pressing of part of the metal sheet layer by punching.

A pre-etching step of forming guide holes is performed to improve a feeling of hole edge by preventing the metal sheet layer from being pressed.

Specifically, the pre-etching step includes a pre-etching step of forming a masking layer on part of the stack, forming guide grooves by etching part of the metal sheet layer on which the masking layer is not formed, and manufacturing an etched stack by removing the masking layer and a step of forming holes by perforating the guide grooves of the etched stack.

The average diameter of the guide grooves may be larger than the target average diameter of the holes by 0.05 mm to 0.2 mm, or 0.06 mm to 0.18 mm.

Figure 8:
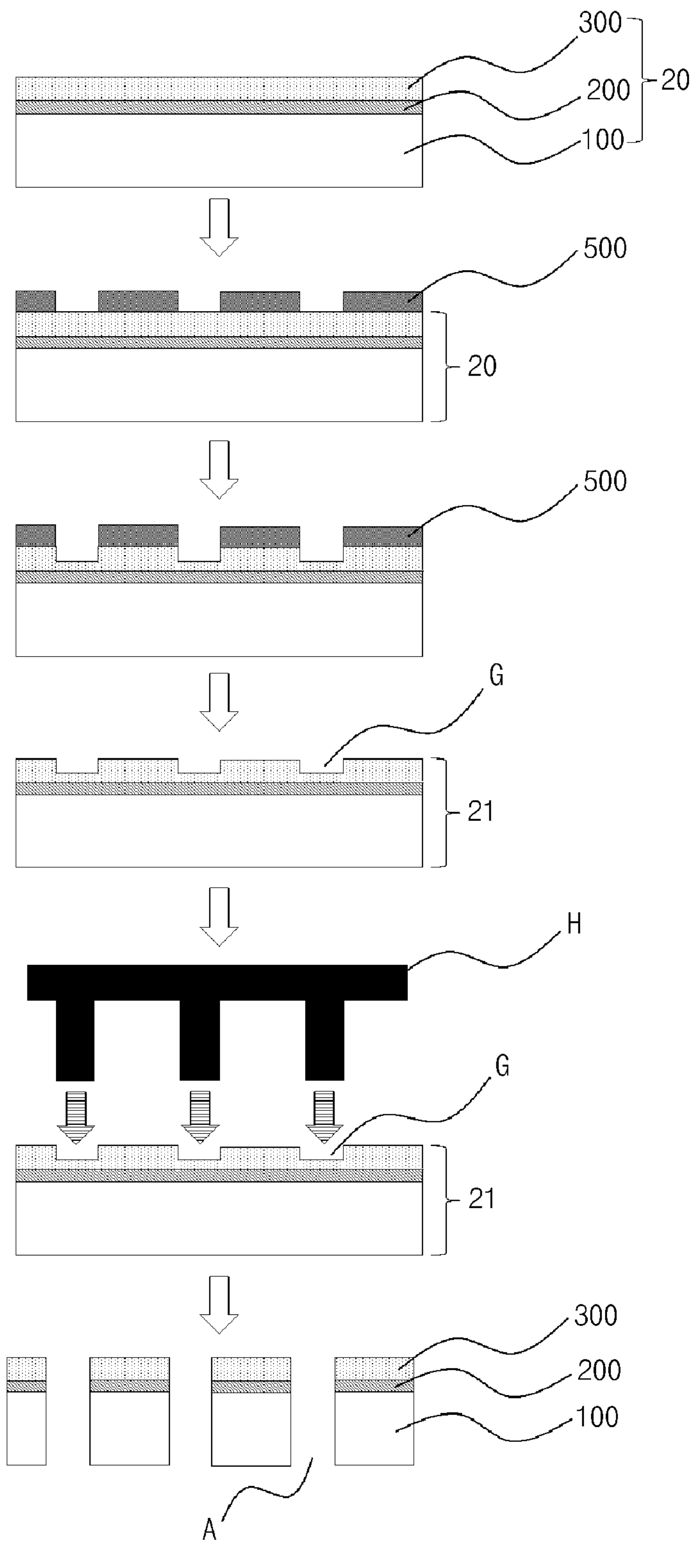

Referring to FIG. 8, the pre-etching step may include a pre-etching step of forming a masking layer 500 on part of the stack 20, forming guide grooves G by etching part of the metal sheet layer 300 on which the masking layer is not formed, and manufacturing an etched stack 21 by removing the masking layer 500 and a step of forming holes by perforating the guide grooves G of the etched stack 21.

The masking layer may be formed by using a generally-used masking film. For example, the masking layer may be formed by using a photosensitive film. Specifically, in this step, by attaching the photosensitive film to the metal sheet layer and removing part of the photosensitive film by applying UV light to the photosensitive film through a mask, the photosensitive film may be left on part of the metal sheet layer to form the masking layer, and by removing the photosensitive film through a mask, an area where the metal sheet layer is exposed on the surface may exist.

Furthermore, in this step, to selectively remove only the part of the metal sheet layer 300 on which the masking layer is not formed and to minimize damage to the masking layer or the steel plate, iron chloride may be used as an etchant. However, the present disclosure is not limited thereto.

For example, in the pre-etching step, a negative type photosensitive film may be used, and UV light may be irradiated in doses of 50 $mJ/cm^2$ to 200 $mJ/cm^2$, or 80 $mJ/cm^2$ to 150 $mJ/cm^2$, for 10 to 40 seconds, or 15 to 30 seconds.

Figure 9:
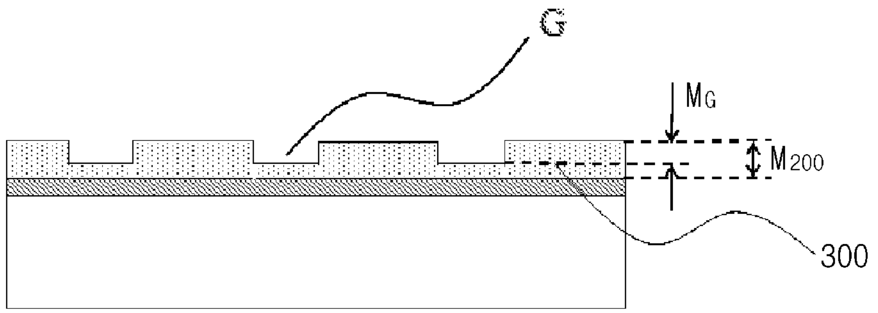
FIG. 9 is a sectional view of an etched stack according to an embodiment of the present disclosure.

In the pre-etching step, the etching depth may be smaller than the average thickness of the metal sheet layer 300 such that the adhesive layer 200 is not exposed after the etching. Specifically, in the pre-etching step, the metal sheet layer may be etched by a depth of 50% to 90% or 60% to 80% of the average thickness of the metal sheet layer. That is, the depth $M_G$ of the guide grooves may be 50% to 90% or 60% to 80% of the average thickness $M_{200}$ of the metal sheet layer (see FIG. 9). When the depth of the guide grooves is within the range, a feeling of edge of the hole edge in appearance is similar to that in etching, and the exterior characteristics of the manufactured speaker grille may be excellent.

The guide grooves may have a concave shape in the thickness direction of the stack, and the depth and the average diameter of the guide grooves may be adjusted by the concentration of an etchant, etching time, or the like. The guide grooves may have various shapes such as a circular shape, an oval shape, a polygonal shape, and the like. When the guide grooves have an oval or polygonal shape, the average diameter of the guide grooves may be the longest distance of the length of the long axis of the guide grooves and the distance from one vertex to another vertex.

Specifically, in the pre-etching step, guide grooves satisfying Equation 1 below may be formed.

$$D_g=D_x+[(T-C)\times 2] \qquad \text{[Equation 1]}$$

In Equation 1, $D_g$ is the average diameter (mm) of the guide grooves, $D_x$ is the target average diameter (mm) of the holes, T is 10% to 20% of the average thickness of the stack, and C is the clearance (mm) of the mold during punching.

Figure 10:
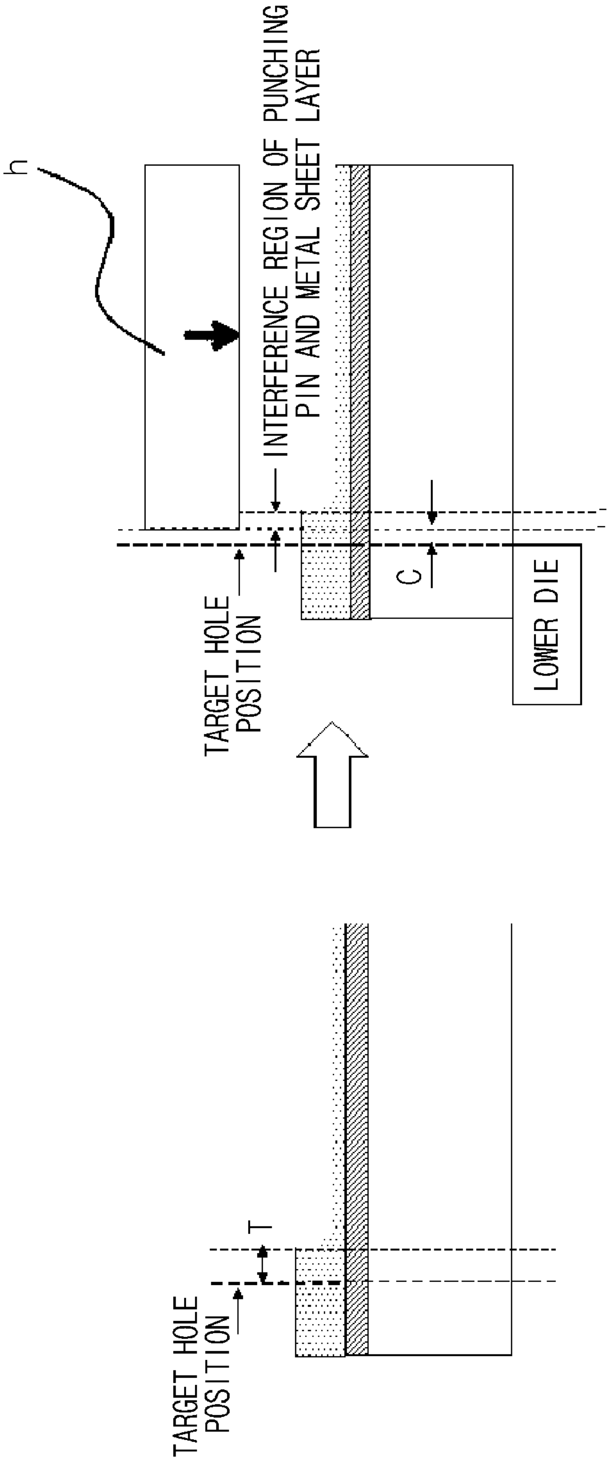
FIG. 10 is a sectional view illustrating a step of forming holes by perforating the etched stack according to an embodiment of the present disclosure.

Referring to FIG. 10, the average diameter of the guide grooves of the etched stack may be set to be slightly greater than the target hole diameter in consideration of the etching tolerance such that punching pins and the metal sheet layer do not interfere with each other during punching. The etching tolerance T may be about 10% to 20% of the average thickness of the metal sheet layer. If the etching tolerance T is not considered, the pins and the metal sheet layer may interfere with each other during punching. For example, considering a clearance of (about 12%) 0.03 mm (one side=0.06/2) for the thickness 0.5 mm of a steel material, the average diameter of the guide grooves may preferably be larger than the target average diameter of the holes by 0.06 mm to 0.18 mm (=(etching tolerance [0.06 mm to 0.12 mm]−clearance [0.03]×2) to avoid interference between the pins and the metal sheet layer during punching.

However, in the hole appearance quality and the functionality, the pre-etching does not have a limitation in clearance, and therefore it is possible to set the average diameter of the guide grooves in pre-etching through an increase in clearance.

Referring to FIG. 10, punching pins h may be disposed in the guide grooves of the etched stack to form holes.

The above-described pre-etching step may be performed at the same time as etching a logo and/or a pattern of an audio brand. That is, the pre-etching may be performed together when a logo for decoration is etched, and thus there may be no cost due to separate etching.

The manufacturing method may additionally include a step of Raining a top coating layer.

Step of Forming Top Coating Layer

In this step, a top coating layer is formed by coating the metal sheet layer 300 of the stack 20 having the plurality of holes formed therein with a colloidal solution containing an organic-inorganic composite and curing the colloidal solution. The top coating layer manufactured by using the colloidal solution containing the organic-inorganic composite may have more excellent transparency than organic coatings and may thus maintain luster unique to metal. Furthermore, the top coating layer may improve physical properties (e.g., heat resistance, Raining efficiency, corrosion resistance, and the like) of the speaker grille by Raining a strong chemical bond due to excellent adhesion to a metal material.

The colloidal solution may be prepared by mixing inorganic particles and organic paint and performing hydrolysis and condensation reactions. The inorganic particles may have an average diameter of 10 nm to 50 nm and may contain one or more materials selected from the group consisting of silicon (Si), aluminum (Al), titanium (Ti), and zirconium (Zr).

No special limitation applies to the organic paint as long as it can be used to surface-treat the speaker grille. For example, the organic paint may be exemplified by a fluoride resin, an acrylic resin, and a silicone resin.

The top coating layer may be cured at a temperature of 180° C. to 250° C., or 200° C. to 250° C., but is not limited thereto.

The above-described vehicle speaker-grille manufacturing method, to which the punching method is applied, has more excellent mass production and economical efficiency than chemical etching or precision machining. Furthermore, the speaker grille manufactured through the above-described manufacturing method exhibits excellent exterior characteristics, particularly, excellent hole exterior characteristics. Accordingly, the speaker grille has excellent decoration and corrosion resistance and is suitable for a vehicle.

Hereinafter, the present disclosure will be described in more detail through embodiments. However, the embodiments are only for a better understanding of the present disclosure, and the scope of the present disclosure is not limited to the embodiments in any sense.

EMBODIMENTS

Embodiment 1: Manufacturing Speaker Grille for Vehicle

As illustrated in FIG. 5, a steel plate (average thickness: 0.5 mm) having a roll form was pre-heated at 70° C., and an adhesive layer was formed by applying a polyurethane-based adhesive to a thickness of 10±5 μm. Thereafter, a stack was manufactured by forming a metal sheet layer by stacking and bonding a stainless sheet (steel grade: STS 304, average thickness: 0.1 mm) having a roll form onto the adhesive layer using a heating roller at 150° C.

A speaker grille was manufactured by forming holes by setting punching pins such that the average diameter of the holes is 2.0 mm and the minimum distance between the holes is 0.5 mm and by perforating the stack.

Embodiment 2

After a stack was manufactured by the same method as that in embodiment 1, a masking layer was formed on a metal thin film layer using a negative type photosensitive film, guide grooves were formed by pre-etching part of the metal thin film layer, on which the masking layer is not formed, to a depth of 70% of the thickness of the metal thin film layer, and the masking layer was removed. The average diameter of the guide grooves was 2.1 mm, and 35 wt % of ferric chloride ($FeCl_3$) aqueous solution was used as an etchant during the etching.

Punching pins were placed in the guide grooves, and a speaker grille was manufactured by forming holes by setting the average diameter of the holes to 2.0 mm and the minimum distance between the holes to 0.5 mm and by perforating the stack.

Comparative Example 1

A speaker grille for a vehicle was manufactured by punching in the same manner as in embodiment 1, except that a stainless steel plate (steel grade: STS 304) having a thickness of 0.6 mm rather than a stack is used.

Comparative Example 2

A speaker grille was manufactured by forming holes having a diameter of 2.0 mm in a stainless steel plate (steel grade: STS 304) having a thickness of 0.6 mm rather than a stack by chemically corroding hole portions depending on a general etching process, the minimum distance between the holes being 0.5 mm. The general etching process consisted of a masking process using a photosensitive film and an etching process using 35 wt % of ferric chloride ($FeCl_3$) aqueous solution as an etchant.

Experimental Example: Evaluation of Exterior Characteristics

Hole cross-sections of the vehicle speaker grilles manufactured in the embodiments and the comparative examples were observed at a magnification level of 150 through an optical microscope, and the fronts and sides of the exteriors were photographed. The results are illustrated in FIG. 11.

Figure 11:
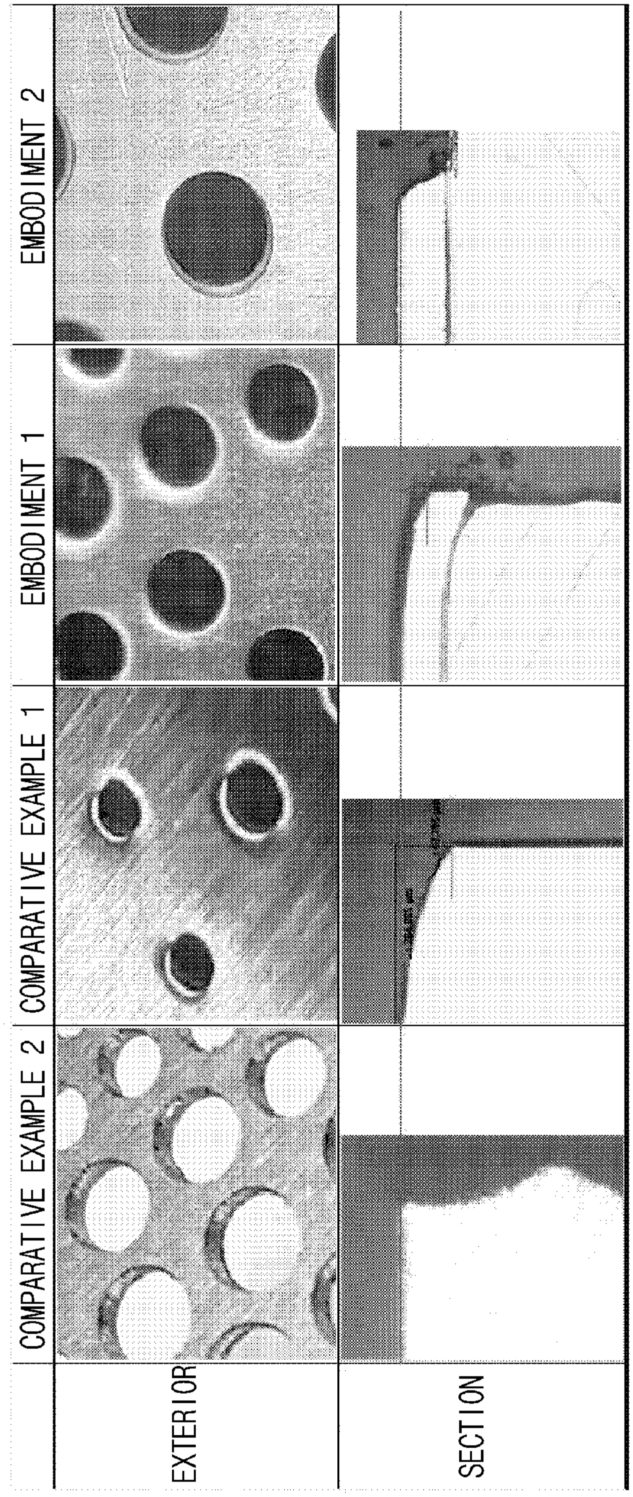
FIG. 11 illustrates exteriors and sections of speaker grilles of embodiments 1 and 2 and comparative examples 1 and 2.

As illustrated in FIG. 11, the vehicle speaker grille of the comparative example 1 manufactured by perforating the steel plate exhibits poor exterior characteristics as pressing (sagging) of edges of the holes is large.

In contrast, the vehicle speaker grilles of the embodiments 1 and 2 exhibit excellent exterior characteristics as the form of the etched grooves is smooth and pressing (sagging) of edges of the holes is small.

As described above, the speaker grille for the vehicle according to the present disclosure exhibits excellent exterior characteristics, particularly, excellent hole exterior characteristics. Accordingly, the speaker grille has excellent decoration and corrosion resistance and is suitable for a vehicle.

The speaker grille for the vehicle according to the present disclosure exhibits excellent exterior characteristics, particularly, excellent hole exterior characteristics. Accordingly, the speaker grille has excellent decoration and corrosion resistance and is suitable for a vehicle.

In addition, the vehicle speaker-grille manufacturing method according to the present disclosure, to which the punching method is applied, has more excellent mass production and economical efficiency than chemical etching or precision machining.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for manufacturing a speaker grille for a vehicle, the method comprising:

- a step of manufacturing a stack by forming an adhesive layer on a steel plate and forming a metal sheet layer on the adhesive layer; and
- a step of forming a plurality of holes through the stack by perforating the stack,
- wherein the step of forming the plurality of holes includes:
  - a pre-etching step of forming a masking layer on part of the stack, forming guide grooves by etching part of the metal sheet layer on which the masking layer is not formed, and manufacturing an etched stack by removing the masking layer; and
  - a step of forming the holes by perforating the guide grooves of the etched stack.

2. The method of claim 1, wherein the guide grooves have an average diameter larger than a target average diameter of the holes by 0.05 mm to 0.2 mm.

3. The method of claim 1, wherein in the pre-etching step, the metal sheet layer is etched by a depth of 50% to 90% of an average thickness of the metal sheet layer.

4. The method of claim 1, wherein the guide grooves formed in the pre-etching step satisfy an equation:

$$D_g=D_x+[(T-C)\times 2]$$

where $D_g$ is an average diameter (mm) of the guide grooves, $D_x$ is a target average diameter (mm) of the holes, T is 10% to 20% of an average thickness of the stack, and C is a clearance (mm) of a mold during punching.

5. The method of claim 1, wherein the adhesive layer contains one or more adhesives selected from the group consisting of a polyurethane-based adhesive, a polyester-based adhesive, and a polyolefin-based adhesive.

6. The method of claim 1, wherein the layers of the stack are formed on the steel plate by a roll-to-roll method.

7. The method of claim 1, wherein in the step of forming the plurality of holes, the holes have an average diameter of 0.5 mm to 3.0 mm, and a minimum distance between the holes is 0.5 mm or more.

8. The method of claim 1, further comprising:

a step of forming a top coating layer by coating the metal sheet layer of the stack having the plurality of holes formed therein with a colloidal solution containing an organic-inorganic composite and curing the colloidal solution.

9. The method of claim 8, wherein the colloidal solution is prepared by mixing inorganic particles and organic paint and performing hydrolysis and condensation reactions.

10. The method of claim 8, wherein the inorganic particles have an average diameter of 10 nm to 50 nm and contain one or more materials selected from the group consisting of silicon (Si), aluminum (Al), titanium (Ti), and zirconium (Zr).

* * * * *